US012580452B2

(12) United States Patent　　　(10) Patent No.:　US 12,580,452 B2

Antao et al.　　　　　　　　　　(45) Date of Patent:　Mar. 17, 2026

---

(54) HEATSINK WITH SLITS TO REDUCE EDDY CURRENT LOSSES

(71) Applicants: The Texas A&M University System, College Station, TX (US); Board of Regents, The University of Texas System, Austin, TX (US)

(72) Inventors: Dion S. Antao, College Station, TX (US); Shiyu Zhang, Bryan, TX (US); Dorsa Talebi, College Station, TX (US); Matthew C. Gardner, Dallas, TX (US); Sri Vignesh Sankarraman, Dallas, TX (US)

(73) Assignees: The Texas &AM University System, College Station, TX (US); Board of Regents, The University of Texas System, Austin, TX (US)

( * ) Notice: Subject to any disclaimer, the term of this patent is extended or adjusted under 35 U.S.C. 154(b) by 288 days.

(21) Appl. No.: 18/114,247

(22) Filed: Feb. 25, 2023

(65) Prior Publication Data

US 2023/0275492 A1　Aug. 31, 2023

Related U.S. Application Data

(60) Provisional application No. 63/314,243, filed on Feb. 25, 2022.

(51) Int. Cl.
　*H02K 3/24*　　　(2006.01)
　*H02K 3/42*　　　(2006.01)
　*H02K 9/22*　　　(2006.01)

(52) U.S. Cl.
　CPC ............... *H02K 9/227* (2021.01); *H02K 3/24* (2013.01); *H02K 3/42* (2013.01)

(58) Field of Classification Search
　CPC .. H02K 3/24; H02K 3/42; H02K 9/22; H02K 9/227
　See application file for complete search history.

(56) References Cited

U.S. PATENT DOCUMENTS

| | | | |
|---|---|---|---|
| 2008/0149303 A1* | 6/2008 | Chang | H02K 9/227 165/104.11 |
| 2008/0218004 A1* | 9/2008 | Mukaide | H02K 41/03 310/12.25 |
| 2008/0303356 A1* | 12/2008 | Aso | H02K 41/031 310/15 |

(Continued)

FOREIGN PATENT DOCUMENTS

| | | | | |
|---|---|---|---|---|
| CN | 106655563 A | * | 5/2017 | |
| GB | 2485185 A | * | 5/2012 | H02K 1/14 |
| KR | 200241054 Y1 | * | 10/2001 | |

OTHER PUBLICATIONS

KR200241054, machine translation of kr200241054, Oct. 2001 (Year: 2001).*

Qu, Machine Translation of CN106655563, May 2017 (Year: 2017).*

*Primary Examiner* — Eric Johnson

(74) *Attorney, Agent, or Firm* — Jackson Walker LLP

(57) ABSTRACT

A heatsink for an electric motor, the heatsink comprising a heat spreader configured to be placed in proximity to a winding of the electric motor, a channel formed through the heat spreader and comprising a coolant inlet and a coolant outlet, and a surface feature formed into a back face of the heat spreader that faces the winding and is configured to reduce eddy currents induced in the heatsink.

9 Claims, 7 Drawing Sheets

(56)                    References Cited

U.S. PATENT DOCUMENTS

2011/0082021 A1*    4/2011   Burns ..................... B04B 9/02
                                                    494/84
2014/0312718 A1*   10/2014   Li ........................... H02K 1/20
                                                    310/12.29
2014/0332194 A1*   11/2014   Durland ............... H02K 49/046
                                                    29/598
2017/0194838 A1*    7/2017   Marvin ............... H02K 15/026

* cited by examiner

HEATSINK WITH SLITS TO REDUCE EDDY CURRENT LOSSES

CROSS-REFERENCE TO RELATED APPLICATIONS

This patent application claims priority from, and incorporates by reference the entire disclosure of, U.S. Provisional Application No. 63/314,243 filed on Feb. 25, 2022.

STATEMENT REGARDING FEDERALLY SPONSORED RESEARCH

This invention was made with government support under DE-AR0001356 awarded by the U.S. Department of Energy. The government has certain rights in the invention.

TECHNICAL FIELD

The present disclosure relates generally to heatsinks, but not by way of limitation, to heatsinks with features that reduce the effects of eddy currents.

BACKGROUND

This section provides background information to facilitate a better understanding of the various aspects of the disclosure. It should be understood that the statements in this section of this document are to be read in this light, and not as admissions of prior art.

The design of cooling systems for electric motors can be as important as the electromagnetic design itself. Improving the cooling system's ability to extract heat from the motor increases the power that the motor can produce. For high-power density motors, such as those used for aerospace applications, the cooling system must be aggressive and will often be a forced liquid system. One of the most aggressive liquid cooling methods is often implemented by having a fluid flow directly through the windings. The conduits carrying the coolant can run through a cutout made within the windings or through the stator teeth. Even though the windings are cooled directly, there are some disadvantages to this method. If the conduits run through the slots, this reduces the copper fill factor. To achieve the same torque, the slot area or current density must be increased. If the conduits are run through the stator teeth, the stator flux is reduced, increasing the required number of amp-turns to achieve the same torque. Additionally, the conduits and the coolant can add to the eddy current losses if they are electrically conducting.

SUMMARY

This summary is provided to introduce a selection of concepts that are further described below in the Detailed Description. This summary is not intended to identify key or essential features of the claimed subject matter, nor is it to be used as an aid in limiting the scope of the claimed subject matter.

According to aspects of the disclosure, a heatsink for an electric motor includes a heat spreader configured to be placed in proximity to a winding of the electric motor, a channel formed through the heat spreader and comprising a coolant inlet and a coolant outlet, a plurality of slits formed into at least one of a back face of the heat spreader that faces the winding and a front face of the heatsink that faces away from the end winding. The plurality of slits are configured to reduce eddy currents induced in the heatsink.

According to aspects of the disclosure, a heatsink for an electric motor includes a heat spreader configured to be placed in proximity to a winding of the electric motor, a channel formed through the heat spreader and comprising a coolant inlet and a coolant outlet, and a surface feature formed into a back face of the heat spreader that faces the winding and is configured to reduce eddy currents induced in the heatsink.

BRIEF DESCRIPTION OF THE DRAWINGS

A more complete understanding of the subject matter of the present disclosure may be obtained by reference to the following Detailed Description when taken in conjunction with the accompanying Drawings wherein.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Figure 1:
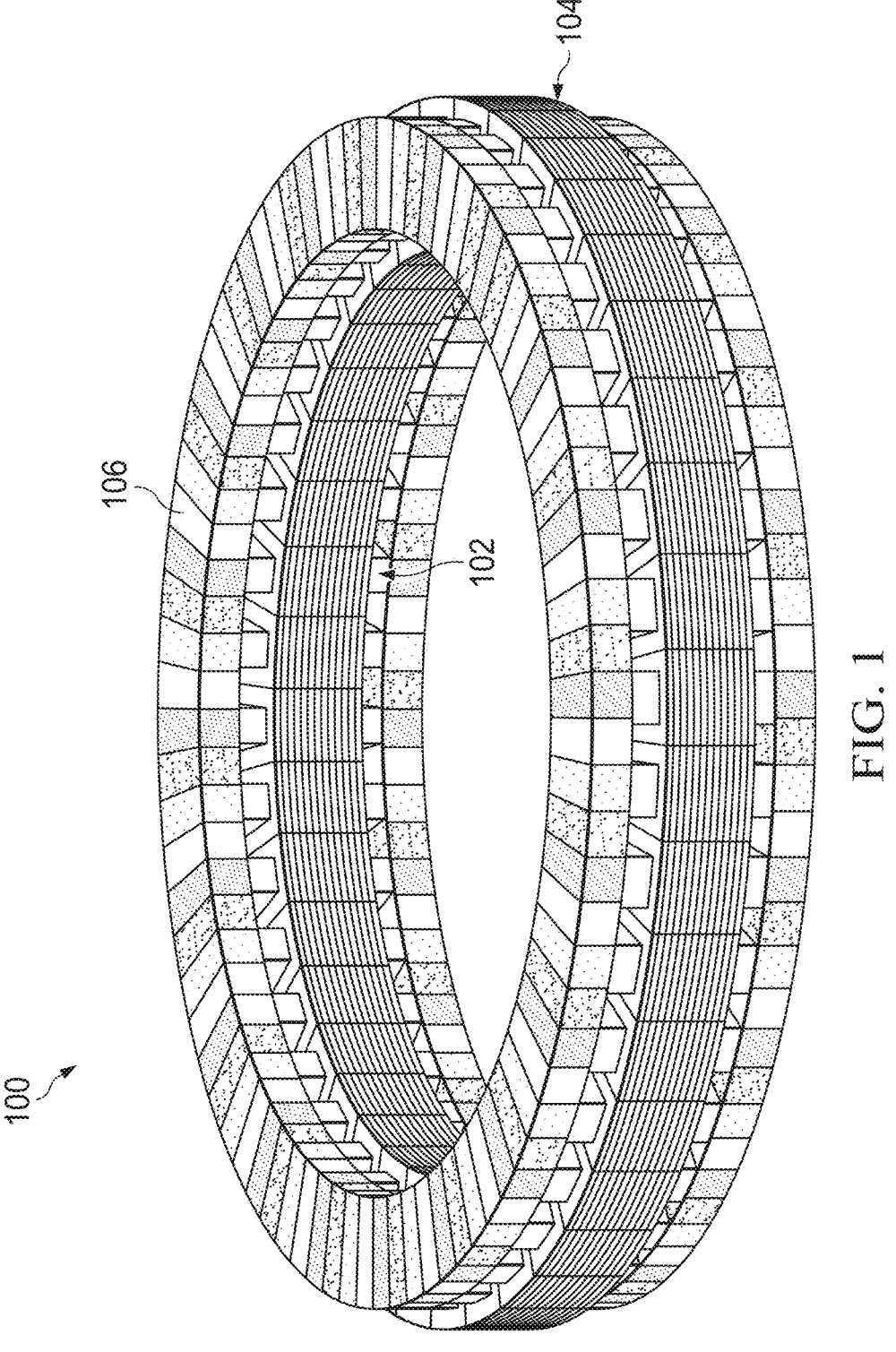
FIG. 1 illustrates a motor topology that may use an end-winding heatsink cooling system according to aspects of the disclosure.
Figure 2:
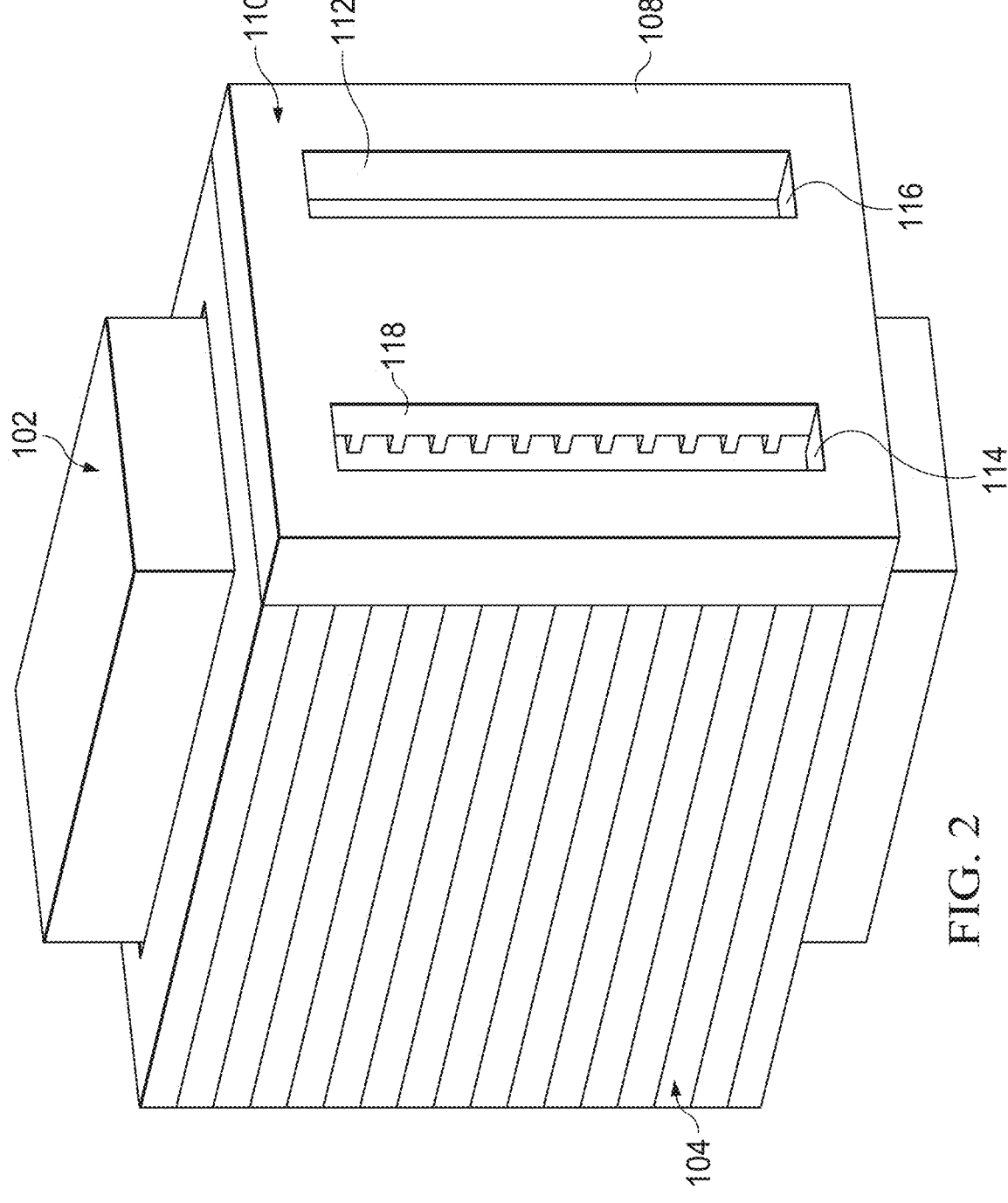
FIG. 2 is a perspective view of a stator tooth and winding with a heatsink located adjacent to an end winding according to aspects of the disclosure.

FIG. 1 illustrates a yokeless and segmented armature axial flux permanent magnet machine 100 for an aerospace application according to aspects of the disclosure. The exemplary motor design illustrated in FIG. 1 includes 42 stator teeth 102 and a plurality of magnets 106 arranged with 40 poles. FIG. 2 illustrates a close-up view of one stator tooth 102 with a heatsink 108. Windings 104 surround each stator tooth 102, and heatsink 108 is positioned to be in contact with outer ends of each winding 104. Placing heatsinks 108 in contact with windings 104 extracts heat from windings 104 without reducing the copper fill factor or the flux in the stator.

Heatsink 108 comprises a heat spreader 110 with a channel 112 formed therethrough. Heat spreader 110 is positioned to be in contact with windings 104 and transfers heat generated in windings 104, and ultimately into coolant that flows through channel 112. Channel 112 extends from a coolant inlet 114 to a coolant outlet 116 and includes a portion that runs along windings 104 to absorb heat therefrom into the coolant flowing through channel 112. Channel 112 includes a plurality of microchannels 118 formed into one or more walls of channel 112 that increase the surface area to volume ratio of channel 112 to enhance heat transfer between the coolant and heatsink 108. The coolant is cycled through heatsink 108 to continually remove heat from windings 104.

A manifold can be coupled to heatsink 108 to direct coolant into and remove coolant from inlet 114 and outlet 116. In some aspects, an outlet 116 from a first heatsink 108 may be coupled to an inlet 114 of a second heatsink 108 in a daisy-chain arrangement. In some aspects, a thermal interface material is placed between heatsink 108 and the windings 104 to improve heat transfer from the windings to the heatsink. The thermal interface material (TIM) may be, for example, thermal paste, thermal epoxy, and phase-change type TIMs.

Heatsink 108 is typically made from a thermally conductive and lightweight material, such as aluminum, copper, etc. Most commonly used heatsink materials such as copper or aluminum are also electrically conductive. Placing heatsinks 108 adjacent to windings 104 exposes heatsinks 108 to some magnetic flux, which varies with time. If the material used for heatsink 108 is electrically conductive, the varying magnetic flux induces eddy currents in heatsink 108 that increases the total losses of the motor. Depending on the type of material used, the eddy current losses may be significant.

The ideal material for heatsink 108 would have low electrical conductivity, high thermal conductivity, and low density. Aluminum, stainless steel, and Monel were studied, chiefly due to their desirable electromagnetic and thermal properties. A solid block of these materials was placed against the windings to check their loss performance using finite element analysis (FEA). Additionally, the temperature of the face adjacent to the windings was determined. Table 1 provides the FEA results for these different heatsink materials.

TABLE 1

Eddy current loss and density for different heatsink material

| Material | Electrical Conductivity (10e6 Siemens/m) | Density (g/cm³) | Nominal Thermal Conductivity (W/m-K) | Eddy Current Loss (kW) | Average Bottom Wall Temperature (° C.) |
|---|---|---|---|---|---|
| Aluminum | 36.9 | 2.7 | 239 | 1.4 | 114 |
| Monel | 2.08 | 8.8 | 21.8 | 0.14 | 199 |
| Stainless Steel | 1.32 | 7.5 | 15.0 | 0.10 | 213 |

Monel and stainless steel have lower eddy current losses than aluminum, but both of these materials are much denser than aluminum, and thus heavier. The thermal conductivities of Monel and stainless steel are also much lower than that of aluminum, which results in a higher thermal resistance high heatsink base (and winding) temperature. Due to the low density and low thermal resistance of the aluminum heatsink, aluminum offers higher power density and favorable heat transfer between the winding and the heatsink relative to Monel and stainless steel. However, the eddy current losses of 1.4 kW from using aluminum must be reduced.

The eddy currents induced are dependent on the path over which they flow. The heatsink spreader and endcap have large paths for the eddy currents. One potential way to reduce the induced eddy currents is to break the paths in which the eddy currents flow by introducing slits and/or surface treatments into faces of a heat spreader. The slits may run in any direction (e.g., vertically, horizontally, and any angle in between). The slits may be placed on a back face of the heat spreader (i.e., the face that interfaces with the windings), on a front face of the heat spreader (i.e., the face that faces away from the windings, and/or on top, bottom, or side faces of the heat spreader). Surfaces treatments includes features that break up the smooth surface of the heat spreader. The slits/surface treatments reduce the effective area in which the eddy currents can be induced, which can reduce the eddy current losses by more than 20% in some cases.

Figure 3:
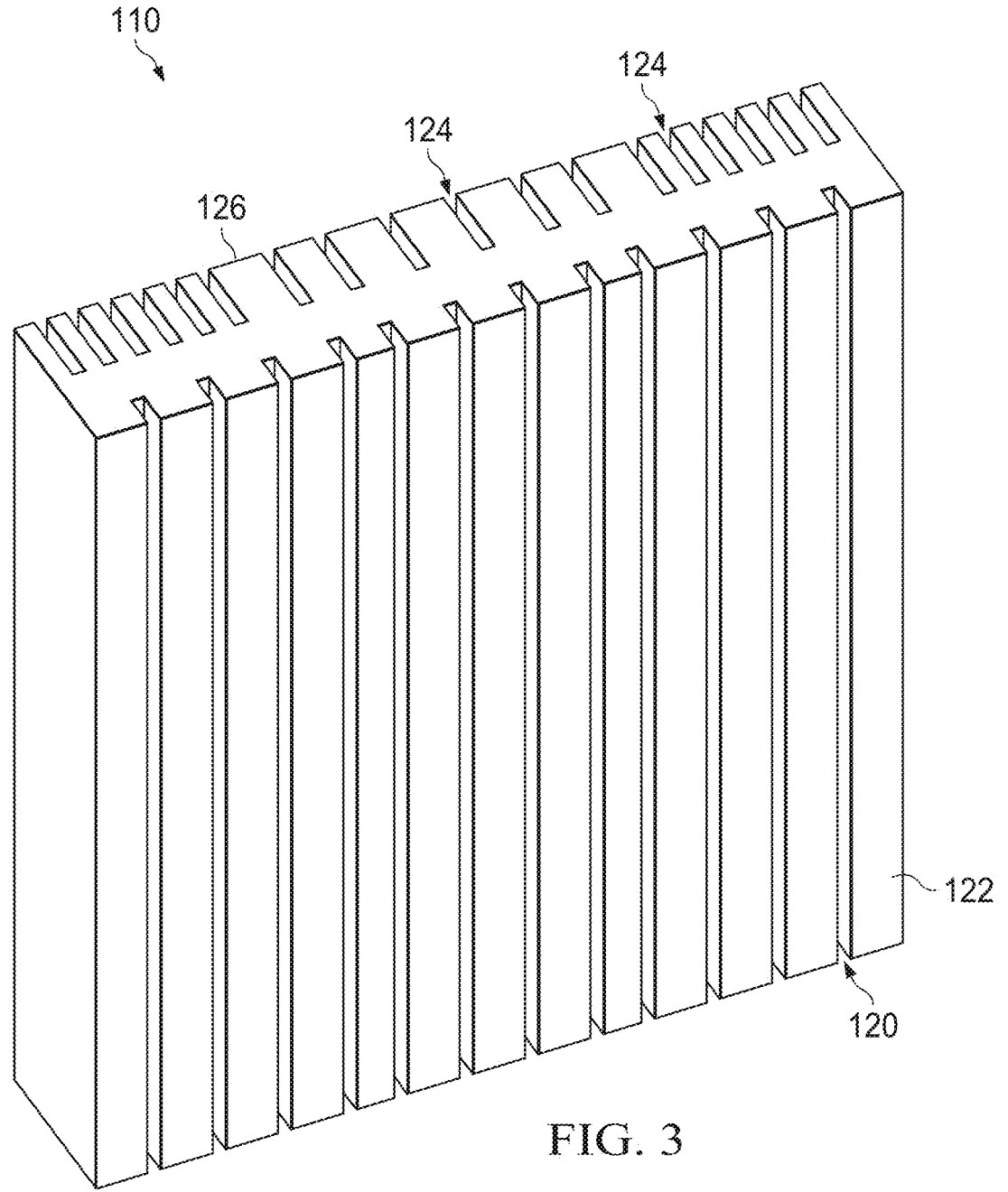
FIGS. 3 and 4 illustrate back and front perspective views, respectively, of a heatsink according to aspects of the disclosure.
Figure 4:
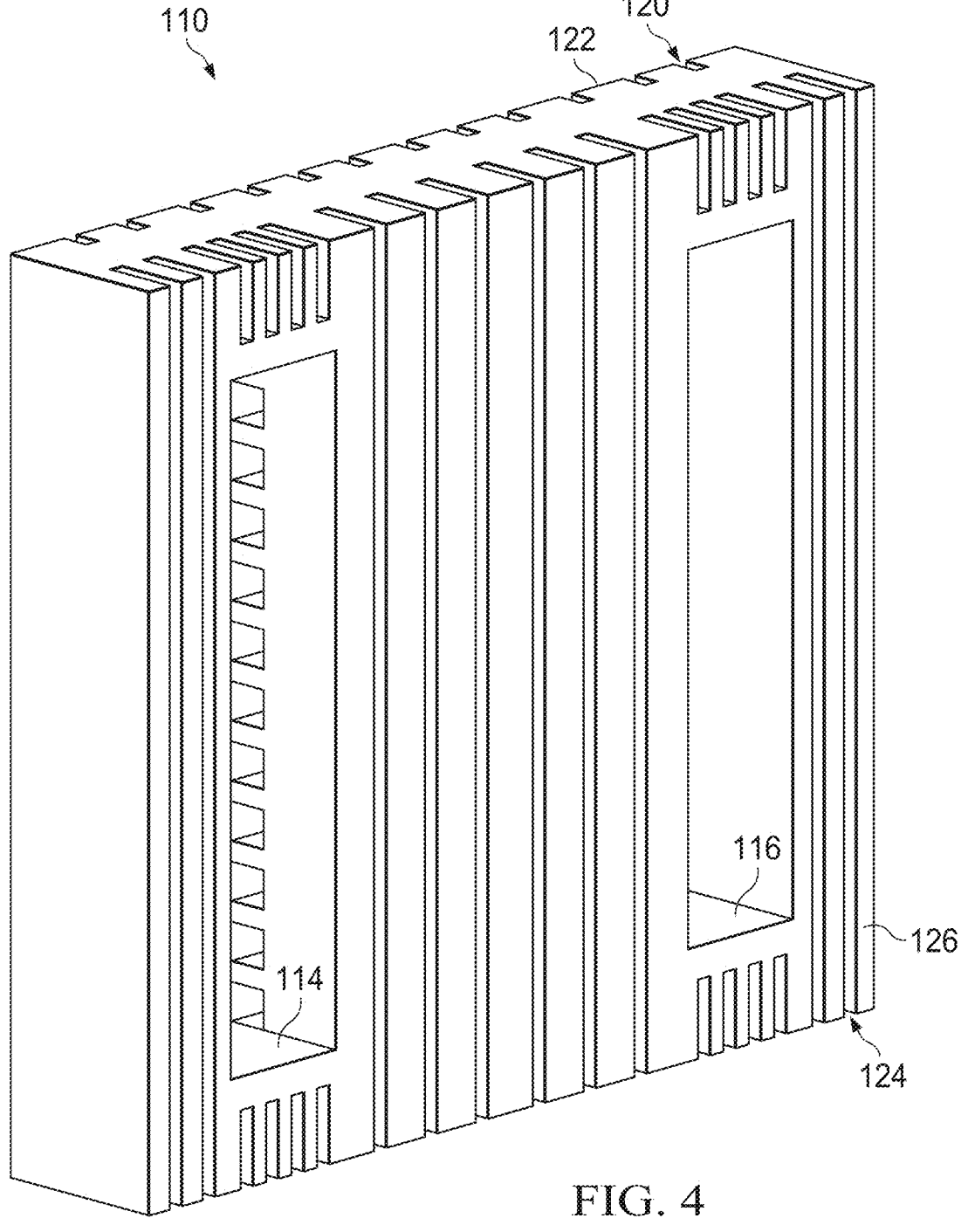

FIGS. 3 and 4 illustrate heat spreader with 110 with a plurality of vertical slits 120 formed into a back face 122 of heat spreader 110 and a plurality of vertical slits 124 formed into a front face 126 of heat spreader 110. As used herein, vertical is meant to describe an orientation of the slits that is perpendicular to the windings and horizontal is meant to describe an orientation of the slits that is horizontal to the winding. The plurality of vertical slits 120 are shown in FIG. 3 as having uniform spacing, depth, and length. In other aspects, the spacing, depth, and length of the plurality of slits 120 may be varied. For example, the plurality of vertical slits 124 comprise a greater depth than the plurality of slits 120, and several of the plurality of vertical slits 124 are shown with shorter lengths. As illustrated in FIG. 4, lengths of the vertical slits 124 that would intersect inlet 114 and outlet 116 are shorter so that inlet 114 and outlet 116 have a continuous edge formed around their edges so that they may be sealed to prevent coolant from leaking. In other aspects, the spacing, depth, and length of the plurality of vertical slits 124 may be varied.

Figure 5:
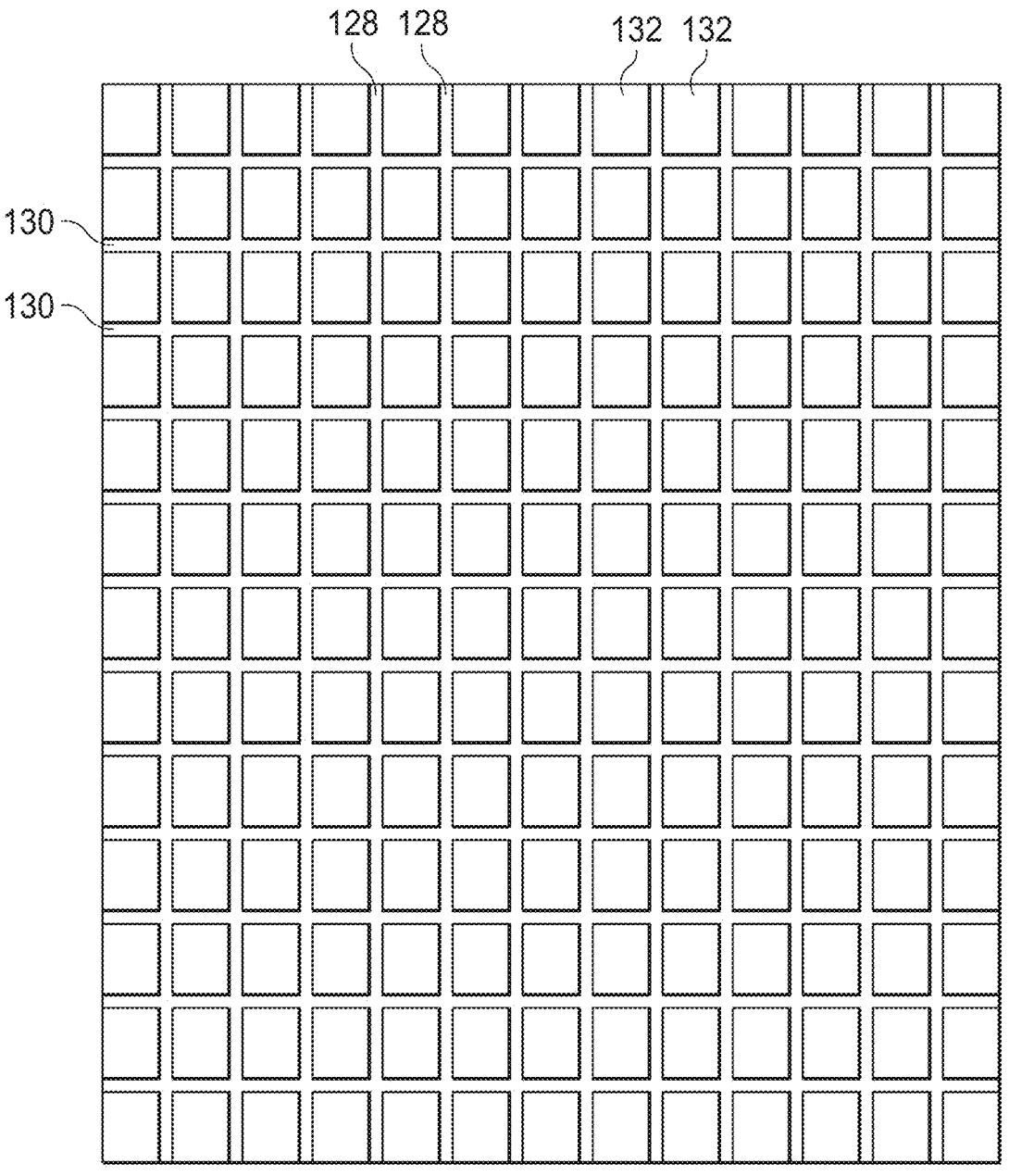
FIG. 5 illustrates a back view of a heatsink with vertical and horizontal slits formed into the heat spreader according to aspects of the disclosure.
Figure 6:
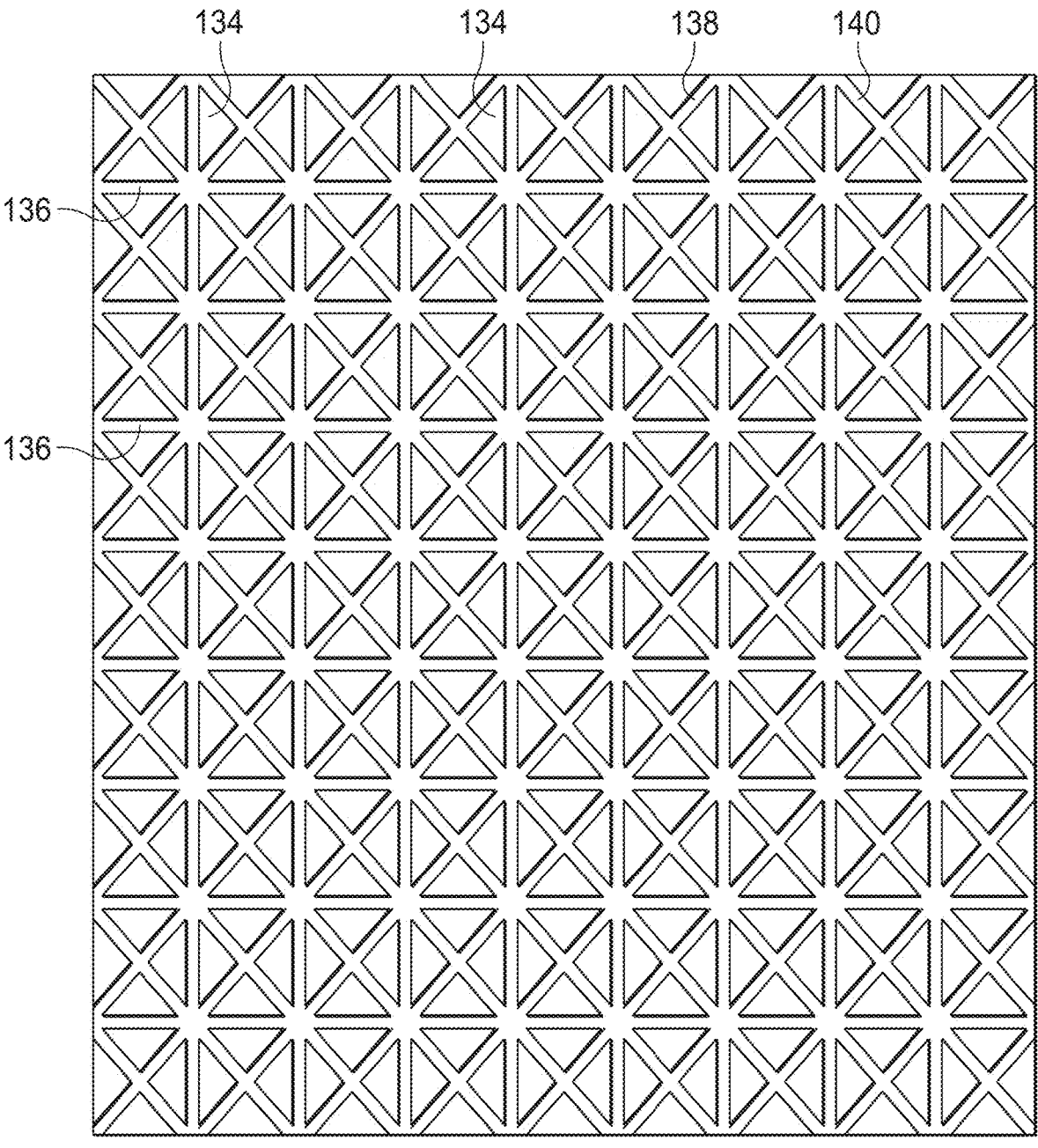
FIG. 6 illustrates a back view of a heatsink with vertical, horizontal, and diagonal slits formed into the heat spreader according to aspects of the disclosure.
Figure 7:
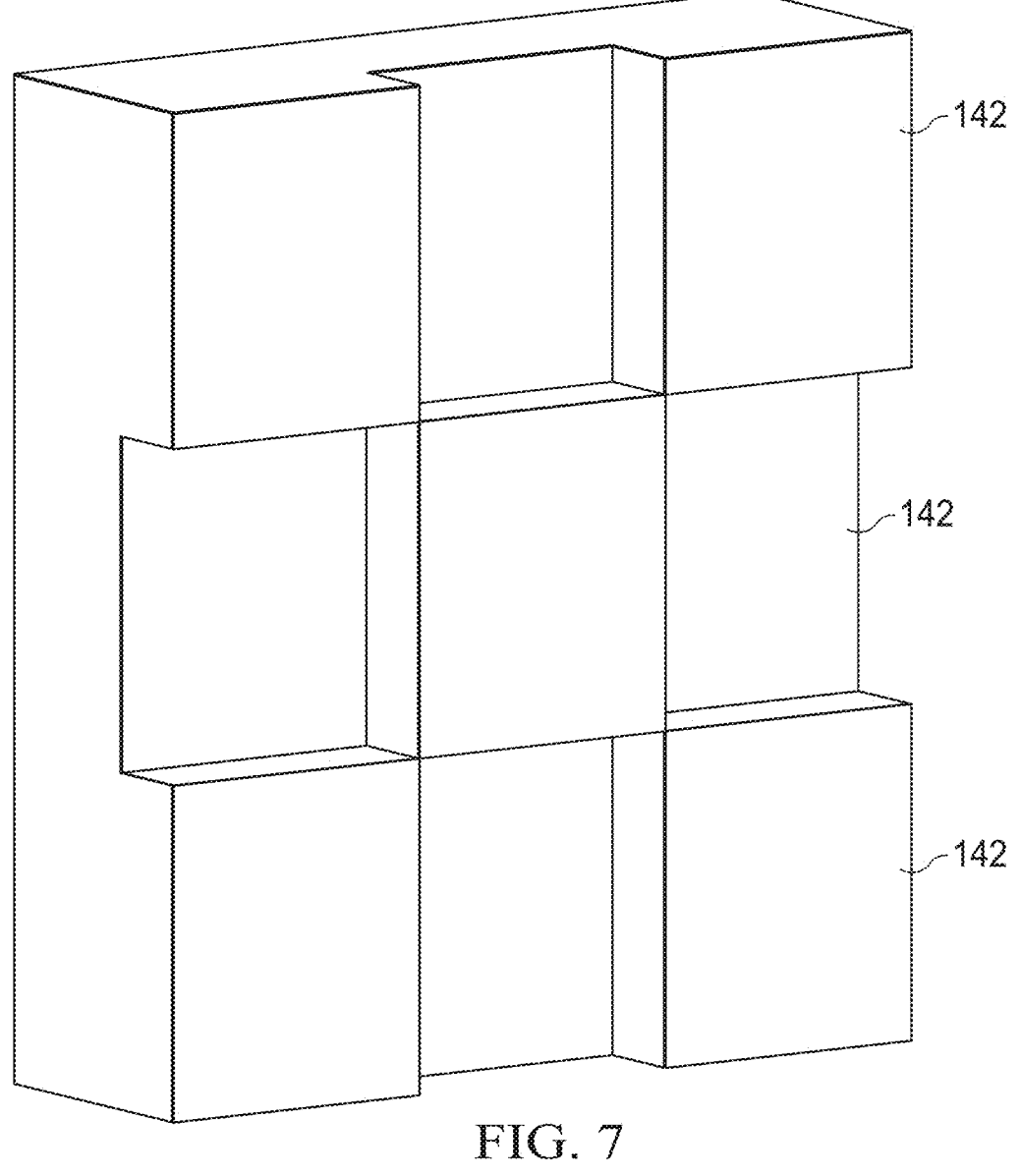
FIG. 7 illustrates a back view of a heatsink with a checkerboard (e.g., alternating raised blocks) pattern formed into the heat spreader according to aspects of the disclosure.

FIGS. 5-7 illustrate various alternative configurations of slits/surface treatments for a back face that can be used with heat spreader 110. FIG. 5 illustrates a face with a plurality of vertical slits 128 and a plurality of horizontal slits 130 that divide the face into a plurality of rectangular islands 132. As illustrated in FIG. 5, each island 132 is a square. In other aspects, the spacing and number of slits may be varied to increase or decrease the number of islands and to alter the shape of the islands.

FIG. 6 illustrates back 122 with a plurality of vertical slits 134, a plurality of horizontal slits 136, a first plurality of diagonal slits 138 in a first direction, and a second plurality of diagonal slits 140 in a second direction dividing face 122 in a plurality of triangular islands. Diagonal slits 138/140 are shown orthogonal to each other. In other aspects, the angle between diagonal slits 138/140 may be increased or decreased. In other aspects, additional diagonal slits may be in included.

It will be appreciated that the parameters of the slits/surface treatments may be varied to balance the reduction of eddy-current losses in the heatsink and the thermal resistance of the heatsink. For example, increasing the depth and/or width of the slits reduces eddy-current losses, but increases thermal resistance. In some aspects, the slits may have cross sections other than rectangular. For example, slits with rounded, polygonal, and the like cross sections can be used. FIGS. 3-6 also illustrate the slits as evenly spaced across the heatsink. In other aspects, the spacing of the slits may be non-uniform. For example, it may be advantageous in some aspects to have a first slit spacing in one section of the heat spreader and a second slit spacing in another section of the heat spreader. In some aspects, the depth of the slits may be varied across the heat spreader, with slits at a plurality of depths being used.

Increasing the number of slits decreases the eddy current losses but also increases the heatsink thermal resistance for heat dissipation to the coolant fluid. Therefore, an optimal number of slits that provides balances the decrease in eddy current losses with the reduction in thermal conductivity can be tuned as needed. Simulation has shown that horizontal slits provide more loss reduction and thermal resistance increase than the vertical slits for an exemplary design.

FIG. 7 illustrates face 122 with a checkerboard pattern formed from a plurality of islands 140. The plurality of islands 142 are arranged so that adjacent islands are at different heights to disrupt the smooth surface of face 122. FIG. 7 illustrates a 3 by 3 array of islands 142, but it will be appreciated that the number of columns and rows of islands 142 may be increased or decreased depending on the application.

Although various embodiments of the present disclosure have been described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

Conditional language used herein, such as, among others, "can", "might", "may", "e.g.", and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A heatsink for an electric motor, the heatsink comprising:
  a heat spreader configured to be placed in proximity to an end winding of the electric motor;
  a channel formed through the heat spreader and comprising a coolant inlet and a coolant outlet; and
  a plurality of islands formed into a back face of the heat spreader that faces the end winding, each island of the plurality of islands being formed by intersections of a plurality of slits and having a triangular shape,
  wherein the plurality of islands are configured to reduce eddy currents induced in the heatsink.

2. The heatsink of claim 1, wherein adjacent islands of the plurality of islands extend to at least two different heights.

3. The heatsink of claim 2, further comprising a plurality of slits formed into a front face of the heatsink.

4. The heatsink of claim 3, wherein the plurality of slits of the front face of the heatsink are oriented perpendicular to the end winding.

5. The heatsink of claim 1, wherein the plurality of slits comprise slits oriented in four different directions.

6. The heatsink of claim 5, wherein at least one slit of the plurality of slits is oriented perpendicular to the end winding.

7. The heatsink of claim 5, wherein at least one slit of the plurality of slits is oriented parallel to the end winding.

8. The heatsink of claim 5, wherein at least one slit of the plurality of slits is oriented relative to the end winding at an angle between perpendicular and parallel.

9. The heatsink of claim 1, wherein the channel comprises a plurality of microchannels that increase a surface area to volume ratio of the channel.

* * * * *